(12) United States Patent
Yannuzzi et al.

(10) Patent No.: US 12,149,564 B2
(45) Date of Patent: Nov. 19, 2024

(54) COMPLIANT NODE IDENTIFICATION

(71) Applicant: Cisco Technology, Inc., San Jose, CA (US)

(72) Inventors: Marcelo Yannuzzi, Vufflens-la-Ville (CH); Benjamin William Ryder, Lausanne (CH); Jean Andrei Diaconu, Haute-Savoie (FR); Hervé Muyal, Gland (CH); Hitesh S. Saijpal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 291 days.

(21) Appl. No.: 17/877,508

(22) Filed: Jul. 29, 2022

(65) Prior Publication Data
US 2024/0039958 A1 Feb. 1, 2024

(51) Int. Cl.
*H04L 29/06* (2006.01)
*G06F 21/00* (2013.01)
*H04L 9/40* (2022.01)

(52) U.S. Cl.
CPC .................................. *H04L 63/20* (2013.01)

(58) Field of Classification Search
None
See application file for complete search history.

(56) References Cited

U.S. PATENT DOCUMENTS

| 9,858,166 | B1* | 1/2018 | Gong .................... G06F 16/284 |
| 9,949,129 | B1 | 4/2018 | Henry et al. |
| 10,601,787 | B2 | 3/2020 | Pritikin et al. |
| 10,713,664 | B1 | 7/2020 | Alagappan et al. |
| 11,101,995 | B1* | 8/2021 | Oliver ................... G06F 16/783 |
| 2005/0021689 | A1 | 1/2005 | Marvin et al. |
| 2009/0099860 | A1 | 4/2009 | Karabulut et al. |
| 2014/0032724 | A1 | 1/2014 | Sabin et al. |
| 2014/0222522 | A1 | 8/2014 | Chait |
| 2014/0280961 | A1 | 9/2014 | Martinez et al. |
| 2015/0281287 | A1 | 10/2015 | Gill et al. |
| 2016/0277498 | A1* | 9/2016 | Kulkarni ................. H04L 67/10 |
| 2016/0330248 | A1 | 11/2016 | Zhang et al. |
| 2016/0344736 | A1 | 11/2016 | Khait et al. |

(Continued)

OTHER PUBLICATIONS

"Global Apps, Local Compliance", online: https://incountry.com/, accessed May 24, 2022, 10 pages.

(Continued)

*Primary Examiner* — Lisa C Lewis
(74) *Attorney, Agent, or Firm* — BEHMKE INNOVATION GROUP LLC; James M. Behmke; James J. Wong

(57) ABSTRACT

In one embodiment, a device may obtain an identifier of a proof of location process (PLP) and an identifier of a node where the PLP is executed. The device may receive a query from a compliance engine for a proof of location of the node where the PLP is executed. The device may identify, based on the identifier of the PLP and the identifier of the node, a physical location of the node. The device may provide, to the compliance engine, a response to the query that is indicative of the physical location of the node, wherein the compliance engine enforces one or more data compliance policies with respect to a workload executed by the node and based on the physical location of the node.

20 Claims, 5 Drawing Sheets

(56) References Cited

U.S. PATENT DOCUMENTS

| | | | |
|---|---|---|---|
| 2017/0170970 | A1 | 6/2017 | Leighton et al. |
| 2017/0201569 | A1 | 7/2017 | Fu et al. |
| 2017/0300309 | A1 | 10/2017 | Berger et al. |
| 2018/0027022 | A1 | 1/2018 | Nagaratnam et al. |
| 2018/0124066 | A1 | 5/2018 | Minkovich et al. |
| 2018/0124113 | A1 | 5/2018 | Lock et al. |
| 2018/0260566 | A1 | 9/2018 | Chaganti et al. |
| 2018/0287892 | A1* | 10/2018 | Hall .................... H04L 67/1001 |
| 2019/0014123 | A1 | 1/2019 | Akireddy et al. |
| 2019/0228171 | A1 | 7/2019 | Mathur |
| 2020/0050620 | A1 | 2/2020 | Clark et al. |
| 2020/0142735 | A1 | 5/2020 | Maciocco et al. |
| 2020/0202268 | A1 | 6/2020 | Retna et al. |
| 2020/0219111 | A1 | 7/2020 | Nair et al. |
| 2020/0293675 | A1 | 9/2020 | Antonatos et al. |
| 2020/0319907 | A1 | 10/2020 | Jain |
| 2020/0364351 | A1 | 11/2020 | Sanchez et al. |
| 2021/0006972 | A1 | 1/2021 | Guim Bernat et al. |
| 2021/0152561 | A1 | 5/2021 | Shelton et al. |
| 2021/0286638 | A1 | 9/2021 | Fan et al. |
| 2021/0329001 | A1 | 10/2021 | Barton et al. |
| 2021/0360037 | A1 | 11/2021 | Beckman et al. |
| 2021/0365816 | A1 | 11/2021 | Sears et al. |

OTHER PUBLICATIONS

"Global Cloud Service Provider", online: https://us.ovhcloud.com/, accessed May 24, 2022, 11 pages.
"Google Distributed Cloud", online: https://cloud.google.com/distributed-cloud, accessed May 24, 2022, 8 pages.
Kurian, Thomas, "How Google Cloud is addressing the need for data sovereignty in Europe in 2020", online: https://cloud.google.com/blog/products/identity-security/how-google-cloud-is-addressing-data-sovereignty-in-europe-2020, accessed May 24, 2022, 2 pages.
"Gaia-X: A Federated Secure Data Infrastructure", online: https://www.gaia-x.eu/, accessed May 24, 2022, 6 pages.
"RegTech 100", online: https://fintech.global/regtech100/, accessed May 24, 2022, 14 pages.
"OneTrust Cloud Solutions", online: https://www.onetrust.com/, accessed May 24, 2022, 5 pages.
"Collibra—The Data Intelligence Cloud", online: https://www.collibra.com/us/en, accessed May 24, 2022, 4 pages.
"LogicGate Risk Cloud", online: https://www.logicgate.com/, accessed May 24, 2022, 5 pages.
"Governance and Security for Low-Code/No-Code Applications", online: https://www.zenity.io//, accessed May 24, 2022, 6 pages.
Zacks, et al., "Network Data Objectivization, Classification, Verification and Privacy via Ring-Oriented Metadata", Defensive Publication Series, Jul. 2021, 11 pages, Technical Disclosure Commons.
Martinez, et al, "Ontology-Based Information Extraction from the Configuration Command Line of Network Routers," MIKE 2014, Lectures Notes in Artificial Intelligence, Springer, Cork, Ireland, Dec. 2014.
Martinez, et al., "An Ontology-Based Information Extraction System for bridging the configuration gap in hybrid SDN environments," 2015 IFIP/IEEE International Symposium on Integrated Network Management (IM), Jul. 2015, 9 pages, IEEE, Ottawa, ON, Canada.
"Secure Production Identity Framework for Everyone", online: https://spiffe.io/, accessed Jul. 27, 2022, 6 pages.
"Spire Concepts", online: https://spiffe.io/docs/latest/spire-about/spire-concepts/, accessed Jul. 27, 2022, 10 pages.
Pritikin, et al., "Bootstrapping Remote Secure Key Infrastructure (BRSKI)", Request for Comments 8995, May 2021, 116 pages, IETF Trust.
"Tetragon eBPF-Based Security Observability & Runtime Enforcement", online: https://isovalent.com/blog/post/2022-05-16-tetragon/, May 16, 2022, accessed Jul. 27, 2022, 16 pages.

* cited by examiner

COMPLIANT NODE IDENTIFICATION

TECHNICAL FIELD

The present disclosure relates generally to compliant node identification.

BACKGROUND

The number and scope of laws and regulations regarding the processing, storage, and use of certain types of data are continually increasing across the world. For instance, the General Data Protection Regulation (GDPR) in Europe places strict requirements on how a user's personal data is collected and processed throughout its lifecycle. The GDPR has extraterritorial reach (it applies to entities outside of the EU) and includes broad definitions of personal data and equally broad definitions of processing activities. These and other requirements have spawned independent efforts across several countries to ensure that modern applications comply with specific data regulation at national, federal, or state level, particularly those that are cloud delivered.

The enforcement of data compliance has only been made more complex and potential violations made more likely as applications are increasingly being developed as a set of distributed services running across a mix of multi-cloud and edge infrastructures that are handling a mix of data types differentially subject to various regulations. Unfortunately, enforcement of data compliance requirements largely occurs non-specifically and in a programmatic blind-spot. Given the current regulatory environment and trends, continuing to treat data compliance as an afterthought in this manner will likely yield increased violations of data compliance regulations which may result in substantial fines, penalties, and/or other negative impacts to data handlers.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
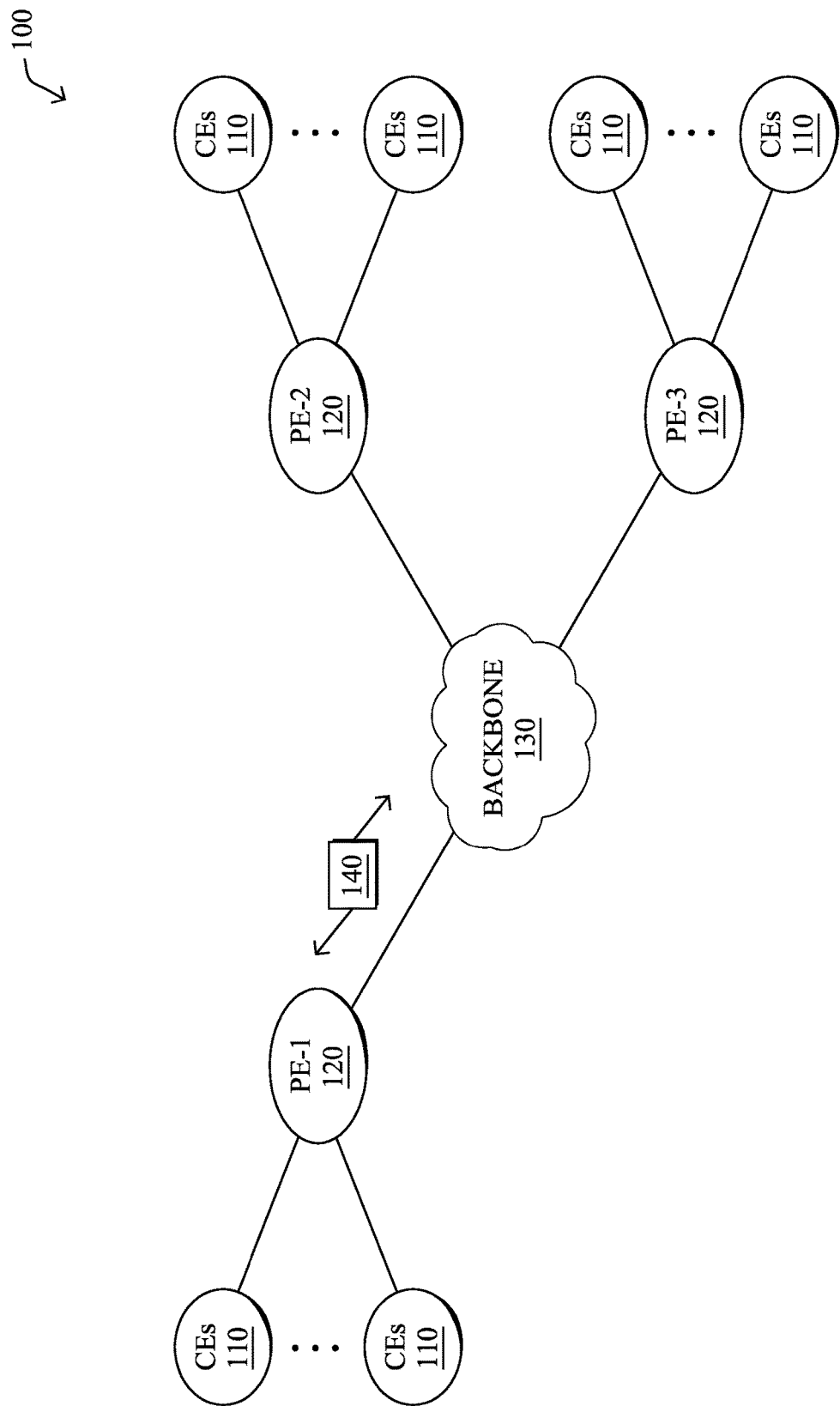
FIGS. 1A-1B illustrate an example communication network.

According to one or more embodiments of the disclosure a device may obtain an identifier of a proof of location process (PLP) and an identifier of a node where the PLP is executed. The device may receive a query from a compliance engine for a proof of location of the node where the PLP is executed. The device may identify, based on the identifier of the PLP and the identifier of the node, a physical location of the node. The device may provide, to the compliance engine, a response to the query that is indicative of the physical location of the node, wherein the compliance engine enforces one or more data compliance policies with respect to a workload executed by the node and based on is the physical location of the node.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/ Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/ 5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/ LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
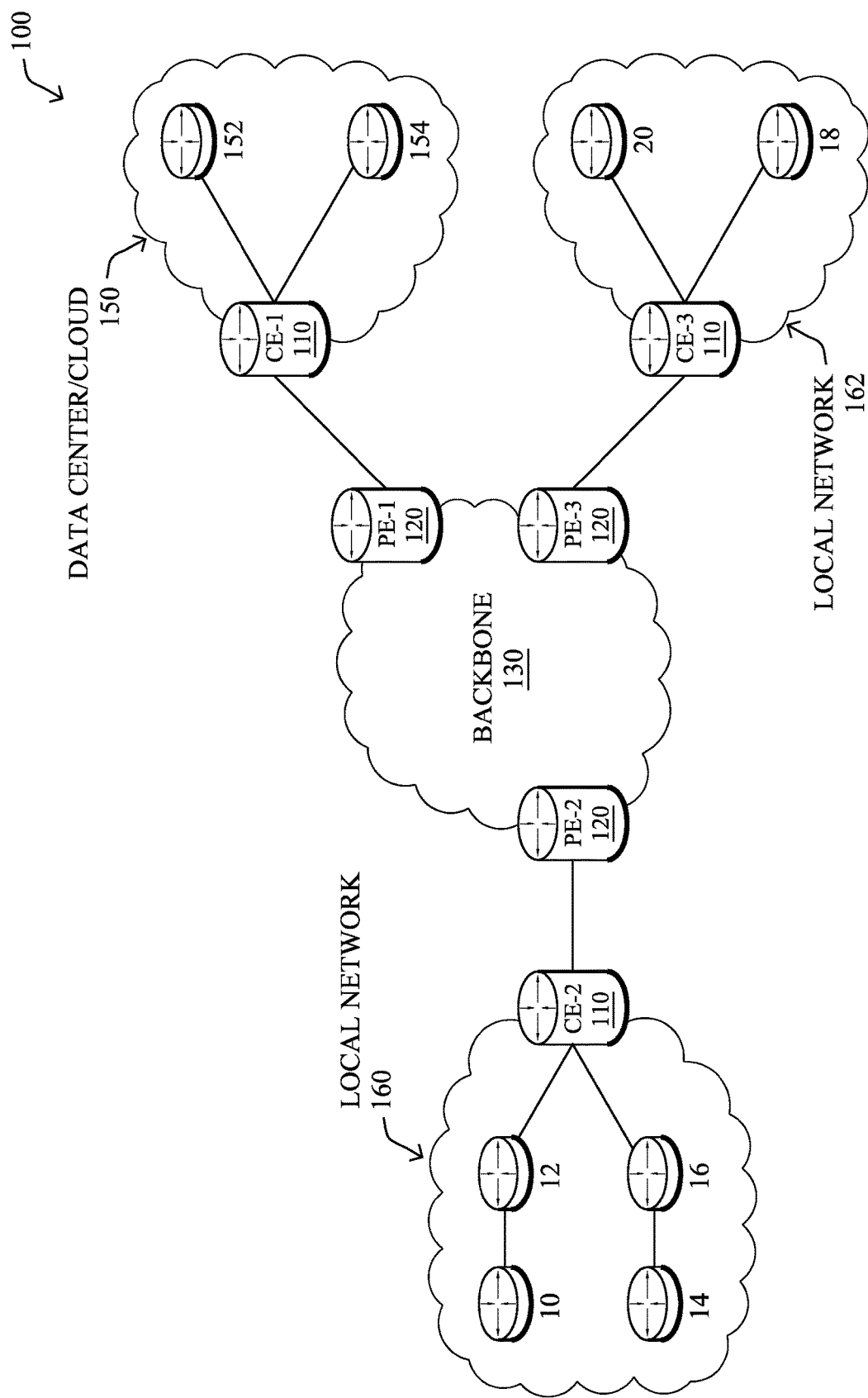

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
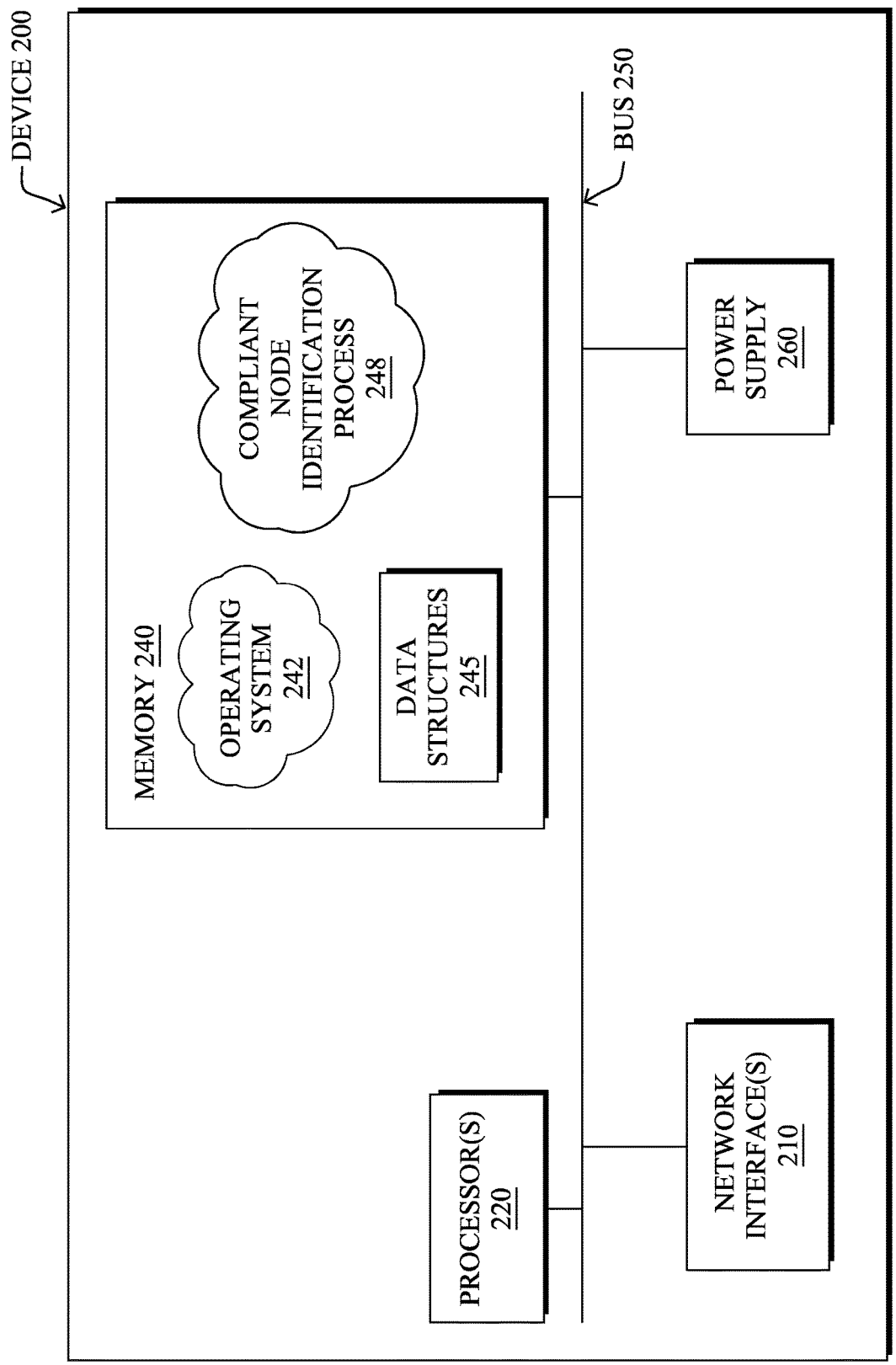
FIG. 2 illustrates an example network device/node.

FIG. 2 is a schematic block diagram of an example node/device 200 (e.g., an is apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise compliant node identification process 248, as described herein, any of which may alternatively be located within individual network interfaces.

As noted above, the number and scope of laws and regulations regarding the processing, storage, use, communication, etc. of certain types of data are continually increasing across the world. Even though edge computing offers a model to comply with is data processing regulations, ensuring the location of application workloads is a challenging problem. This is especially true when the platforms that manage the applications at the edge control neither the edge nodes' hardware nor their operating systems (OSs). For instance, this is the case in scenarios allowing either to Bring Your Own Edge Node (BYOEN) or utilize edge nodes managed by a third party (e.g., by a service provider).

Configuration domains may lack pre-established trust and may represent a challenging environment to ensure the location of application workloads at edge nodes. For example, edge nodes may not have pre-established trust with an access network (AN), ANs may not have preestablished trust with application edge management platforms, and/or application edge management platforms may not have pre-established trust with edge nodes.

Node location, such as (latitude/longitude) coordinates and other parameters might be manually entered by an IT/SRE admin in the node management platforms. However, if a node is moved (e.g., to another country), it may still bootstrap and show up in a map as if it was in its originally configured location. Misconfigurations and human errors may also occur during operations and maintenance tasks (e.g., a wrong latitude/longitude might be entered, a node might be associated to the wrong site, etc.). Malicious actions may also occur.

Hence, existing mechanisms are unable to allow an application node manager platform to ensure compliance deployments and localization of application workloads at the edge in an automated manner, particularly when the applications process data subject to data sovereignty regulations and other data compliance constraints and/or when an application edge management platform manages neither the hardware of an edge node nor its OS. Existing mechanisms instead rely on tight control on the edge node hardware and its OS or a trust anchor in the node itself. Indeed, mechanisms to meet data compliance and residency obligations may rely on infrastructure and service providers, which provide tight control on the infrastructure used. For instance, when the edge nodes are offered and managed by Cloudflare, Vapor, Edge Presence, Google or Microsoft, and is organizations use their tools to deploy applications at the edge. Vendors also provide Zero Touch Provisioning (ZTP) solutions to securely onboard and claim nodes at the edge, but these solutions are also based on proprietary techniques.

In addition, the number and scope of laws and regulations regarding the processing, storage, and use of certain types of data are continually increasing across the world. For instance, the General Data Protection Regulation (GDPR) in Europe places strict requirements on how a user's personal data is collected and processed throughout its lifecycle. The GDPR has extraterritorial reach (it applies to entities outside of the EU) and includes broad definitions of personal data and equally broad definitions of processing activities. These and other requirements have spawned independent efforts across several countries to ensure that modern applications comply with specific data regulation at national, federal, or state level, particularly those that are cloud delivered.

Legal uncertainty in the eye of accelerated digital transformation has resulted in concerns around cross-border data transfers and has given rise to "data localization" trends including its most severe form "data sovereignty". This dynamic is posing complex challenges to the organizations that process and manage the application data, since legal obligations and constraints often vary from country to country. The challenge is even greater since data compliance requirements are usually not limited to data sovereignty obligations. Depending on the type of application, data compliance may demand the amalgamation of other requirements, such as industry-specific regulation (e.g., complying with HIPAA obligations in the healthcare industry in the US), or organization-specific rules (e.g., on how to handle confidential information, i.e., data that might not be regulated by the law).

The enforcement of data compliance has only been made more complex and potential violations made more likely as applications are increasingly being developed as a set of distributed services running across a mix of multi-cloud and edge infrastructures that are handling a mix of data types differentially subject to various regulations. Unfortunately, enforcement of data compliance requirements largely occurs non-specifically and in a programmatic blind-spot. Given the current regulatory environment and trends, continuing to treat data compliance as an afterthought in this manner will likely yield increased violations of data compliance regulations which may result in substantial fines, penalties, and/or other negative impacts to data handlers Compliant Node Identification The techniques herein introduce mechanisms for ensuring data compliance at network nodes, such as edge nodes. Data compliance may be ensured through a trust framework and a mechanism to prove the location of nodes where an application's workloads may execute. As such, the introduced mechanism may provide the automated identification of nodes that comply with data compliance policies with respect to a workload executed by the node.

Illustratively, the techniques described herein may be performed by hardware, software, and/or firmware, such as in accordance with compliant node identification process 248, which may include computer executable instructions executed by the processor 220 (or independent processor of interfaces 210) to perform functions relating to the techniques described herein.

Specifically, according to various embodiments, a device may obtain an identifier of a proof of location process (PLP) and an identifier of a node where the PLP is executed. The device may receive a query from a compliance engine for a proof of location of the node where the PLP is executed. The device may identify, based on the identifier of the PLP and the identifier of the node, a physical location of the node. The device may provide, to the compliance engine, a response to the query that is indicative of the physical location of the node, wherein the compliance engine enforces one or more data compliance policies with respect to a workload executed by the node and based on the physical location of the node.

Operationally, and according to various embodiments, the techniques described herein may be utilized to identify nodes that comply with data compliance policies with respect to a workload executed by the node.

Figure 3:
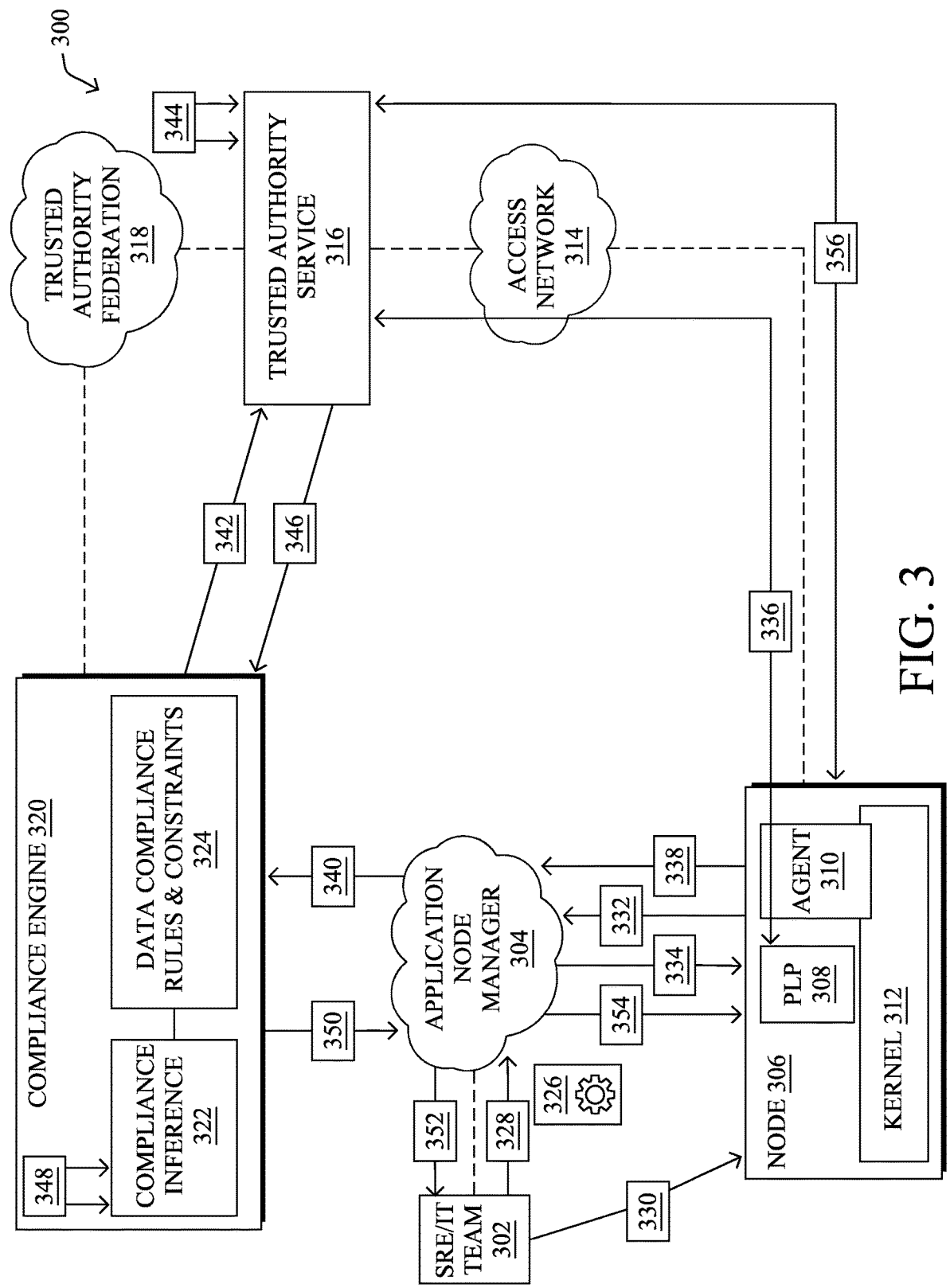
FIG. 3 illustrates an example architecture for compliant node identification.

FIG. 3 illustrates an example architecture 300 for compliant node identification, in accordance with one or more embodiments described herein. Architecture 300 may is utilize a trust framework and/or mechanism of proving a location of a node where an application workload may execute.

Architecture 300 may include application node manager 304. Application node manager 304 may include a platform that may be used to orchestrate the deployment of an application 326 at a node 306. Node 306 may be an edge node located at a network edge. Application node manager 304 may manage the lifecycle of application 326 at the edge of a network.

In various embodiments, an organization requesting to deploy application 326 may have existing user accounts and/or credentials with application node manager 304. The organization may also have a tenant identification (ID) and/or an assigned authentication token to deploy application 326 at node 306, which may be an edge node.

At 328, a site reliability engineer (SRE) and/or information technology (IT) team member (e.g., SRE/IT team 302) may create a site, assign a site name, add a description to a site, add tags, and other parameters for a site where a workload of application 326 may be deployed. For instance, in some embodiments a member of SRE/IT team 302 may manually assign the location (e.g., by selecting it in a map) and/or adding latitude/longitude coordinates, etc. In other embodiments, such parameters may be computed automatically as part of the process for claiming node 306 into the application node manager 304 platform.

A member of SRE/IT team 302 may also enter the identification (e.g., trusted authority service ID) of trusted authority service 316. Trusted authority service 316 may be associated to access network 314 where the application is planned to be deployed. Such trusted authority service 316 may be managed by SRE/IT team 302 from the organization or by a third party. For instance, in some cases the trusted authority service 316 may be run and/or managed by a service provider (SP) of the organization. Depending on the requirements and/or capabilities of node 306, the trusted authority service 316 may run in a wireless access point (AP), in a wireless LAN controller (WLC), in a layer 2 switch, in a power line communications (PLC) endpoint, in a virtual machine (VM), on dedicated hardware in access network 314, in a private LTE (PLTE), 4G or 5G base, in an aggregation PoP at the near edge or in another network location.

Irrespective of whether trusted authority service 316 is run by the organization, an SP, a third-party entity, etc., various considerations may apply to its operation. For example, the trusted authority service ID of trusted authority service 316 (e.g., an application programming interface (API)) for that specific deployment of a workload may be known in advance by SRE/IT team 302 and/or may be entered as a parameter in application node manager 304 platform at 328. In addition, it may be in the best interest of the organization itself, the SP or any third-party entity implementing and managing trusted authority service 316 to provide trustworthy information in support of complying with data compliance policies.

At 330, in a user space in node 306, a member of SRE/IT team 302 may instruct node 306 to connect to application node manager 304 and obtain the corresponding configuration and management services required in order to enable the deployment of a targeted workload of application 326 at node 306. In various embodiments, this may be achieved by applying a command such as "wget-O-https://app-edge-management.io/bootstrap/tenant-id/get.sh|TOKEN=authentication-token sh".

At 332, node 306, which may be an edge node, may connect to application node manager 304 platform. Node 306 may utilize the connection to provide required parameters to identify the tenant for which the deployment is required. For instance, in some embodiments this may include a tenant ID and/or an authentication token, such as those provided in the example command communicated at 330.

Before deploying a workload of application 326 to node 306, application node manager 304 may require proof of location of node 306. In this manner, application node manager 304 may ensure that any data processing, storage, use, communication, etc. carried out by and/or involving the workload of application 326 on third-party infrastructure, such as node 306, is first compliant with existing data compliance policies.

To this end, application node manager 304 may, at 334, deploy first only an application management layer and spin up a proof of location process (PLP) 308. More is specifically, application node manager 304 may operate as a workload engine which may manage the spin up of workloads, and therefore, may have access to the IDs of the workloads that it manages. Application node manager 304 may make a PLP workload ID available to PLP 308 itself. The PLP workload ID may be provided to PLP 308 in a trustworthy manner (e.g., utilizing trust mechanisms such as authentication, encryption, tokens, certificates, etc.). Application node manager 304 may also provide PLP 308 with the trusted authority service ID (e.g., an API, URI, etc.).

At 336, PLP 308 may attempt to connect to trusted authority service 316. In some examples, PLP 308 may connect to trusted authority service 316 via access network 314. In various embodiments, agent 310 may run locally in node 306 where it may act as a proxy for the trusted authority service ID. In such cases, agent 310 may work in concert with trusted authority service 316. Agent 310 may broker and secure the connection between PLP 308 and the trusted authority service 316. The trust between PLP 308 and the trusted authority service 316 may be established through one or more trust mechanisms established between agent 310 and/or trusted authority service 316.

Utilizing agent 310 as a broker in this manner may enable trusted authority service 316 to create a secure binding. For example, trusted authority service 316 may be enabled to bind PLP 308 to the specific trusted agent 310 running at the infrastructure of node 306. Moreover, the message generated by PLP 308 and proxied by agent 310 may carry the PLP workload ID and/or other relevant parameters, metrics, cryptographic hashes, traces, etc. that application node manager 304 may have instructed to be conveyed to trusted authority service 316.

The binding between the specific PLP 308 and specific agent 310 in the node 306 infrastructure may be momentarily stored by trusted authority service 316. In some embodiments, trusted authority service 316 may also support and/or include means to prove and/or verify the physical location (e.g., geolocation, etc.) of node 306. In other embodiments, such functionality may be provided by an external system. In any case, trusted authority service 316 may bind a (PLP ID, Agent ID) pair to an (Edge Node ID, Operating System (OS) ID) pair.

Once PLP 308 has successfully connected to, communicated its message to, and/or indicated its presence and/or identifying information to trusted authority service 316, PLP 308 may notify, at 338, application node manager 304. As noted above, PLP 308 may be handled and/or managed by application node manager 304. In contrast, agent 310, kernel 312, and/or trusted authority service 316 may not be handled by and/or managed by application node manager 304. For example, agent 310, kernel 312, and/or trusted authority service 316 may be operated by third-parties relative to the organization deploying the application, relative to SRE/IT team 302, and/or relative to the party operating and/or managing application node manager 304.

Application node manager 304 may in turn rely on an external compliance engine 320 to ensure compliant deployments and/or localization of workloads of application 326 at node 306. In some examples, a pull model may be utilized to enlist compliance engine 320 is the selection of compliant nodes. To this end, application node manager 304 may provide, at 340, compliance engine 320 with the trusted authority service ID and/or other relevant parameters such as the workload ID of PLP 308 (e.g., PLP ID) and/or any metrics, cryptographic hashes, traces, etc. that application node manager 304 may have instructed PLP 308 to convey to trusted authority service 316 at 336. Application node manager 304 may also provide an ID of application 326 (e.g., application ID), the corresponding data manifest ID, and/or pointers to these.

The information provided to compliance engine 320 may allow it to determine the categories of sensitive data handled by the application and infer the corresponding data compliance constraints depending on the targeted location for deployment of the workload of application 326. In various embodiments, application node manager 304 may also indicate the targeted industry of application 326 and/or any additional compliance requirements defined by the tenant organization. Compliance engine 320 may utilize these inputs to potentially restrict even further, the resulting data processing constraints.

At 342, a trust mechanism may be established and/or utilized to provide a trusted relationship and/or secure communications between compliance engine 320 and trusted is authority service 316. For example, a trusted authority federation 318 may be utilized, through which compliance engine 320 may build trust and establish a secure connection to trusted authority service 316 as identified by trusted authority service ID at 336. However, in contrast to the trust relationship established between node 306 and trusted authority service 316 via trusted agent 310 at 336, compliance engine 320 may require establishing the trust relationship prior to establishing a connection with trusted authority service 316. In various embodiments, the trust relationship may be established through trust mechanisms such as a public key infrastructure (PKI) and certification authorities (CAs), a W3C registry and verifiable credentials, contractual clauses including Terms and Conditions along with self-asserted certificates supplied by the hyperscalers, a service provider, etc.

Once a trusted connection is established between compliance engine 320 and trusted authority service 316, compliance engine 320 may use the inputs received at 340 (e.g., trusted authority service ID, other relevant parameters such as the PLP ID and/or any metrics, cryptographic hashes, traces, etc. that application node manager 304 may have instructed PLP 308 to convey to trusted authority service 316 at 336, an application ID, the corresponding data manifest ID, and/or pointers to these) to query trusted authority service 316 to get proof of location of node 306 hosting PLP 308.

Trusted authority service 316 may, at 344, parse the query received from compliance engine 320. Trusted authority service 316 may utilize its stored bindings to identify a PLP ID, an Agent ID, a node ID, and/or an OS ID associated with the query.

Based on this, trusted authority service 316 may return a response to the query to compliance engine 320 at 346. The response may include a physical location (e.g., geolocation) of node 306. In various embodiments, the physical location may be returned to compliance engine 320 in the form of latitude/longitude coordinates or other possible formats.

In some embodiments, a state for the PLP ID in trusted authority service 316 may be flushed from trusted authority service 316 at 346. As a result, the state temporarily maintained for PLP ID in trusted authority service 316 may enable a one-time, and three-way, verification process between the key entities involved.

Compliance engine 320 may include and/or have access to data compliance rules and constraints repository 324 and/or compliance inference functionality 322. Compliance inference functionality 322 in compliance engine 320 may have access to data compliance rules and constraints repository 324 where human readable and/or machine-readable data compliance policies are stored.

At 348, compliance inference functionality 322 may analyze the categories of data handled by application 326. For example, compliance inference functionality 322 may utilize the data manifest of application 326, which may have been received by compliance engine 320 at 340, to identify the categories of data handled by application 326. For example, the data manifest of application 326 may include metadata such as data tags indicative of the categories of data handled by application 326.

Compliance inference functionality 322 may determine whether the deployment of specific workloads of application 326 in node 306 targeted for the deployment are compliant with data compliance policies, such as data processing regulations in that location and other data compliance rules and requirements that may have been received as an input at 340. In other words, compliance inference functionality 322 may determine whether node 306 is compliant with respect to deployment and/or execution of a workload of application 326 considering known data compliance policies.

At 350, compliance engine 320 may notify application node manager 304 of the result of its compliance determination. For example, compliance engine 320 may notify application node manager 304 whether a requested deployment of a specific workload of application 326 to node 306 is a compliant request or a non-compliant request with respect to relevant (e.g., to location, to industry, to organization, etc.) data compliance policies. This notification may be a secure communication that may be based on a trust relationship between compliance engine 320 and/or application node manager 304.

At 352, a non-compliant request may be flagged to prevent the deployment of the workload. For example, SRE/IT team 302 may be notified of the non-compliant request and the corresponding deployment may be prevented until an issue causing the non-compliance is solved or the block of its deployment is overridden.

At 354, the application node manager 304 may proceed to deploy the application workload to node 306. This deployment may be based on the request being indicated as compliant by compliance engine 320 at 350. In instances where the state for PLP ID was not flushed from trusted authority service 316 at 346, application node manager 304 may, in some embodiments, notify PLP 308 before the application workload is deployed. In turn, PLP 308 may notify trusted authority service 316, which may be proxied and/or brokered by agent 310. Trust authority service 316 may, based on that notification, flush the state of PLP ID. The PLP 308 may be spawn down and the workload of application 326 may be deployed at node 306.

At 356, trusted authority service 316 may profile and continuously monitor node 306. Such profiling may include and/or combine measurements at different layers in the stack. For example, L1 measurements in radio and PLC environments, L2 and L3 measurements in radio, switching and routing environments, baseline measurements involving the Agents at L7 (application layer), etc. may be utilized. This may enable to detection and/or prevention of potentially non-compliant situations, where an edge node might be unplugged, transported to another location, and/or bootstrapped.

In various embodiments, the bindings created by trusted authority service 316 may be leveraged. For instance, application node manager 304 may act both as a workload engine to manage workload configuration and deployment and as another trusted authority server and controller connected to the trusted authority federation 318. However, application node manager 304 may still rely on specific elements introduced above since application node manager 304 may not be able to attest to the location of edge infrastructure (e.g., node 306) on its own.

Figure 4:
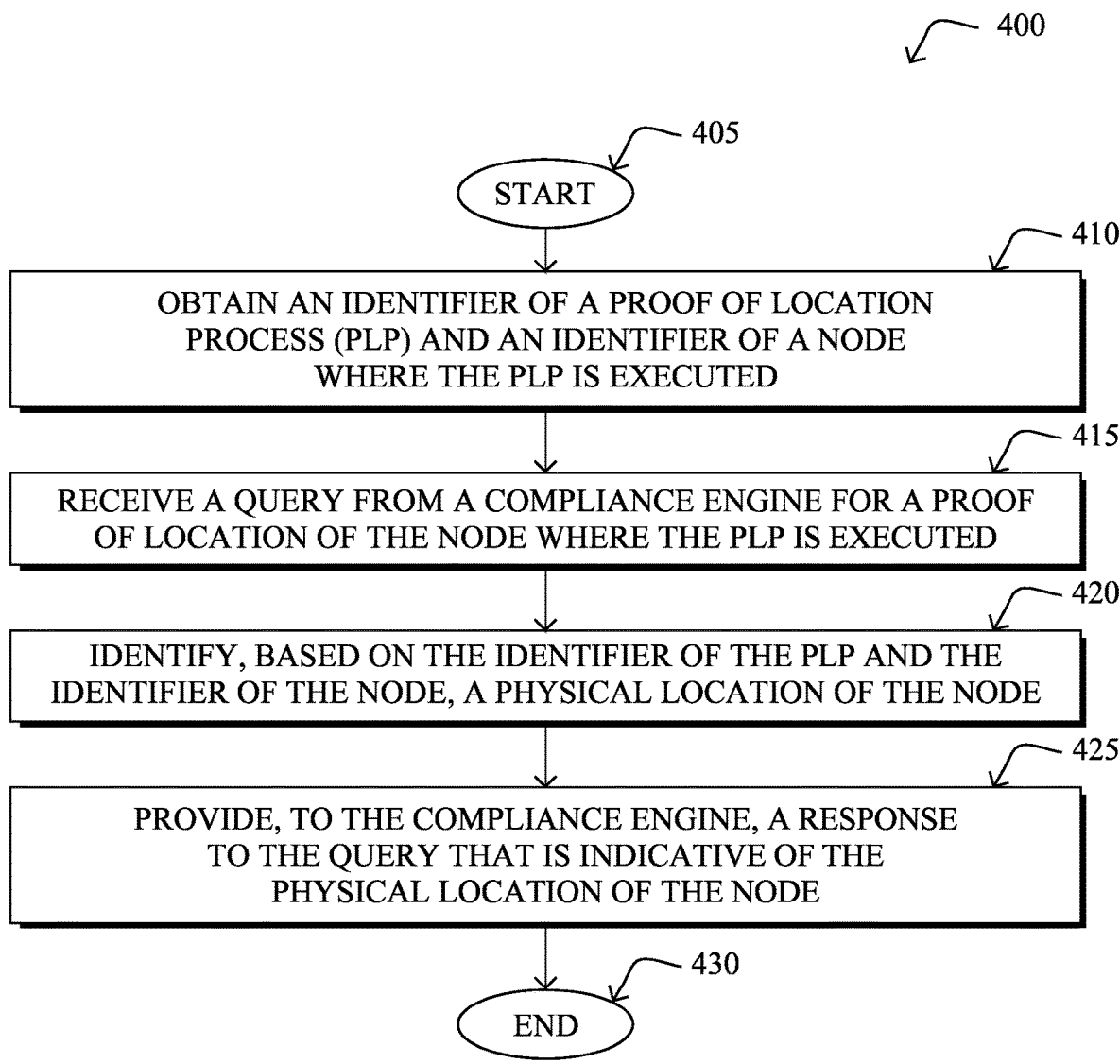
FIG. 4 illustrates an example simplified procedure for compliant node identification.

FIG. 4 illustrates an example simplified procedure (e.g., a method) for compliant node identification, in accordance with one or more embodiments described herein. For example, a non-generic, specifically configured device (e.g., device 200), may perform is procedure 400 by executing stored instructions (e.g., compliant node identification process 248).

The procedure 400 may start at step 405, and continues to step 410, where, as described in greater detail above, a device may obtain an identifier of a PLP and an identifier of a node where the PLP is executed. The node where the PLP is executed may be located at an edge of a network (e.g., an edge node). The identifier of the PLP and the identifier of the node where the PLP is executed may be obtained from an agent proxy of the PLP executed at the node.

At step 415, as detailed above, a device may receive a query from a compliance engine for a proof of location of the node where the PLP is executed.

At step 420, as detailed above, the device may identify, based on the identifier of the PLP and the identifier of the node, a physical location of the node. Communications between the device and the compliance engine and/or the PLP executed by the node may be secured by and/or rely on trust relationships. As such, the device may establish first a trust relationship between the device and the compliance engine and/or establish a second trust relationship between the device and the PLP executed by the node.

At step 425, as detailed above, the device may provide, to the compliance engine, a response to the query that is indicative of the physical location of the node, wherein the compliance engine enforces one or more data compliance policies with respect to a workload executed by the node and based on the physical location of the node. The one or more data compliance policies may specify a location at which a particular type of data used by the workload can be stored, accessed, processed, or sent/communicated. The one or more data compliance policies may be based on at least one of a law, regulation, organizational rule, or industry rule.

The compliance engine may indicate and/or enforce the one or more data compliance policies by instructing or authorizing a management service that provisions workloads for execution by the node to provision the workload. The compliance engine may provide a notification to a user interface when provisioning the workload to the is physical location of the edge node would violate the one or more data compliance policies.

A state associated with the identifier of the PLP may be flushed from the device. Flushing the state may occur upon providing the response to the query and may serve to enable a one-time, and three-way, verification process between the PLP, the device, the compliance engine, etc. The device may, after providing its response to the query, monitor changes to the location of the node where the PLP is executing and/or provide location updates to the compliance engine when changes are detected which may alter whether the deployment is compliant or non-compliant.

Procedure 400 then ends at step 430.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, may ensure data compliance at network nodes, such as those located at the edge of the network. These techniques may ensure data compliance by establishing a trust framework that may be utilized with the proposed mechanism of proving the location of nodes where workloads may be deployed and/or executed. These techniques may then utilize the trusted location determinations to determine programmatically and/or automatically whether a deployment or execution of an application workload is complaint with one or more data compliance policies without the need for manual intervention and with fully trusted and independently verified knowledge of the actual location of the nodes rather than a previously configured location.

While there have been shown and described illustrative embodiments to identify compliant nodes, it is to be understood that various other adaptations and modifications is may be made within the spirit and scope of the embodiments herein. For example, while certain embodiments are described herein with respect to using the techniques herein for certain purposes, the techniques herein may be applicable to any number of other use cases, as well.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a device, an identifier of a proof of location process (PLP) and an identifier of a node where the PLP is executed;

receiving, by the device, a query from a compliance engine for a proof of location of the node where the PLP is executed;

identifying, by the device and based on the identifier of the PLP and the identifier of the node, a physical location of the node; and providing, by the device and to the compliance engine, a response to the query that is indicative of the physical location of the node, wherein the compliance engine enforces one or more data compliance policies with respect to a workload executed by the node and based on the physical location of the node.

2. The method as in claim 1, wherein the one or more data compliance policies specify a location at which a particular type of data used by the workload can be stored, accessed, processed, or communicated.

3. The method as in claim 1, wherein the one or more data compliance policies are based on at least one of a law, regulation, organizational rule, or industry rule.

4. The method as in claim 1, further comprising:
establishing, by the device, a first trust relationship between the device and the compliance engine; and
establishing, by the device, a second trust relationship between the device and the PLP executed by the node.

5. The method as in claim 1, wherein the node is an edge node located at an edge of a network.

6. The method as in claim 5, wherein the compliance engine enforces the one or more data compliance policies by indicating or authorizing a management service that provisions workloads for execution by the node to provision the workload.

7. The method as in claim 5, wherein the compliance engine provides a notification to a user interface when provisioning the workload to the physical location of the edge node would violate the one or more data compliance policies.

8. The method as in claim 1, further comprising:
flushing, from the device, a state associated with the identifier of the PLP.

9. The method as in claim 1, further comprising:
monitoring, by the device, changes to the location of the node where the PLP is executed.

10. The method as in claim 1, wherein the identifier of the PLP and the identifier of the node where the PLP is executed is obtained from an agent proxy of the PLP executed at the node.

11. An apparatus, comprising:
one or more network interfaces;
a processor coupled to the one or more network interfaces and configured to execute one or more processes; and
a memory configured to store a process that is executable by the processor, the process when executed configured to:
obtaining an identifier of a proof of location process (PLP) and an identifier of a node where the PLP is executed;
receiving a query from a compliance engine for a proof of location of the node where the PLP is executed;
identifying, based on the identifier of the PLP and the identifier of the node, a physical location of the node; and
providing, to the compliance engine, a response to the query that is indicative of the physical location of the node, wherein the compliance engine enforces one or more data compliance policies with respect to a workload executed by the node and based on the physical location of the node.

12. The apparatus as in claim 11, wherein the one or more data compliance policies specify a location at which a particular type of data used by the workload can be stored, accessed, processed, or sent.

13. The apparatus as in claim 11, wherein the one or more data compliance policies are based on at least one of a law, regulation, organizational rule, or industry rule.

14. The apparatus as in claim 11, further comprising:
establishing a first trust relationship between the apparatus and the compliance engine; and
establishing a second trust relationship between the apparatus and the PLP executed by the node.

15. The apparatus as in claim 11, wherein the node is an edge node located at an edge of a network.

16. The apparatus as in claim 15, wherein the compliance engine enforces the one or more data compliance policies by indicating or authorizing a management service that provisions workloads for execution by the node to provision the workload.

17. The apparatus as in claim 15, wherein the compliance engine provides a notification to a user interface when provisioning the workload to the physical location of the edge node would violate the one or more data compliance policies.

18. The apparatus as in claim 11, further comprising:
flushing, from the apparatus, a state associated with the identifier of the PLP.

19. The apparatus as in claim 11, further comprising:
monitoring changes to the location of the node where the PLP is executed.

20. A tangible, non-transitory, computer-readable medium storing program instructions that cause a device to execute a process comprising:
obtaining, by the device, an identifier of a proof of location process (PLP) and an identifier of a node where the PLP is executed;
receiving, by the device, a query from a compliance engine for a proof of location of the node where the PLP is executed;
identifying, by the device and based on the identifier of the PLP and the identifier of the node, a physical location of the node; and
providing, by the device and to the compliance engine, a response to the query that is indicative of the physical location of the node, wherein the compliance engine enforces one or more data compliance policies with respect to a workload executed by the node and based on the physical location of the node.

* * * * *

UNITED STATES PATENT AND TRADEMARK OFFICE
CERTIFICATE OF CORRECTION

PATENT NO. : 12,149,564 B2
APPLICATION NO. : 17/877508
DATED : November 19, 2024
INVENTOR(S) : Marcelo Yannuzzi et al.

It is certified that error appears in the above-identified patent and that said Letters Patent is hereby corrected as shown below:

In the Specification

Column 2, Line 1 please amend as shown:
respect to a workload executed by the node and based on Column 4, Line 34 please amend as shown:
node/device 200 (e.g., an apparatus) that may be used with Column 5, Line 11 please amend as shown:
model to comply with data processing regulations, ensur- Column 5, Line 52 please amend as shown:
Vapor, Edge Presence, Google or Microsoft, and organi- Column 7, Line 3 please amend as shown:
embodiments described herein. Architecture 300 may Column 8, Line 21 please amend as shown:
up a proof of location process (PLP) 308. More specifi- Column 9, Line 39 please amend as shown:
trusted authority service 316. For example, a trusted Column 12, Line 2 please amend as shown:
interface when provisioning the workload to the physical Column 12, Line 40 please amend as shown:
stood that various other adaptations and modifications Signed and Sealed this
Fourth Day of March, 2025

Coke Morgan Stewart
*Acting Director of the United States Patent and Trademark Office*